United States Patent [19]

Bossler, Jr.

[11] Patent Number: 4,518,287
[45] Date of Patent: May 21, 1985

[54] METHOD OF FACE MILL GENERATION OF SPIRAL BEVEL GEARS WITH INTEGRAL CENTRAL STRUCTURE AND RESULTING PRODUCT

[75] Inventor: Robert B. Bossler, Jr., Hacienda Heights, Calif.

[73] Assignee: Western Gear Corporation, Lynwood, Calif.

[21] Appl. No.: 396,026

[22] Filed: Jul. 7, 1982

[51] Int. Cl.³ .................. B23F 9/12; B23F 17/00
[52] U.S. Cl. ...................... 409/26; 51/287; 409/30; 74/459.5
[58] Field of Search ............ 409/26, 28, 27, 29, 409/30; 51/33 W, 287; 74/459.5

[56] References Cited

U.S. PATENT DOCUMENTS

| | | | |
|---|---|---|---|
| 1,376,600 | 5/1921 | Blackmore | 409/28 |
| 1,655,076 | 1/1928 | Snow | 409/26 |
| 1,656,506 | 1/1928 | Williams | 409/25 |
| 2,342,232 | 2/1944 | Wildhaber | 409/26 |
| 2,783,686 | 3/1957 | Ciallie et al. | 409/26 |
| 2,932,923 | 4/1960 | Carlsen | 51/33 W |
| 3,213,756 | 10/1965 | Ash | 409/30 X |
| 3,218,931 | 10/1982 | Kotthaus | 409/26 |
| 3,971,293 | 7/1976 | Hunkeler | 409/27 X |
| 4,090,428 | 5/1978 | Kotthaus et al. | 409/28 |

FOREIGN PATENT DOCUMENTS 1084549 6/1960 Fed. Rep. of Germany .

Primary Examiner—Z. R. Bilinsky
Attorney, Agent, or Firm—Pretty, Schroeder, Brueggemann & Clark

[57] ABSTRACT

A gear blank is integrally formed with a shaft or other central structure protruding axially from what is to be the toothed face of the gear. A spiral bevel gear is then cut by the face mill generation method, but with the cutter distance exceeding the outer cone distance. The cutter does not intrude into the area occupied by the shaft. The resulting gear has a negative spiral angle and a reverse tooth curvature.

7 Claims, 7 Drawing Figures

METHOD OF FACE MILL GENERATION OF SPIRAL BEVEL GEARS WITH INTEGRAL CENTRAL STRUCTURE AND RESULTING PRODUCT

FIELD OF THE INVENTION

The present invention relates to gears, and more particularly to spiral bevel gears and the formation thereof by the face mill generation method.

BACKGROUND OF THE INVENTION

Spiral bevel gears are generally cut from a gear blank by a method known as face mill generation using a cutter with blades positioned on the circumference of a circle. The blades of a particular cutter may be selected for roughing, finishing, completing and other such steps. As the cutter rotates, the blades remove material from the blank, as may be observed in FIG. 1 in which a conventional spiral bevel gear cutting arrangement is illustrated. A similar action can be obtained with a cup-shaped grind stone.

While the cutter rotates, it orbits about a machine axis and the blank rotates to simulate a gear mesh. Each descrete orbital motion of the rotating cutter in synchronization with the blank, known as a "roll," generates a single tooth surface or two facing tooth surfaces having the desired lengthwise curvature. Although the curvature is arcuate, it approximates the theoretically optimum spiral configuration.

This gear cutting technique has been used for many years and constitutes the basic principal of operation of a wide variety of gear cutting machines made by Gleason Works of Rochester, N.Y.

When designing a spiral bevel gear to be cut in the manner described above, a large number of interrelated variables must be considered. Once the basic size and pitch cone of the gear have been selected, the cutter diameter and the cutter distance (the radius on which the cutter orbits about a machine axis) are of major importance. These variables determine, to a large extent, the mean spiral angle. The mean spiral angle is the angle between a pitch cone element (PCE) and a tangent to the lengthwise curvature of the tooth at the mean cone distance. Conventionally, spiral angles vary from about +35 to zero degrees, a gear with a zero spiral angle sometime being known as a Zerol gear. A mean spiral angle of less than +15 degrees is unusual in highly loaded environments.

A conventional spiral bevel gear, shown in FIG. 2, has teeth that are oriented in such a way that the concave tooth surfaces face inwardly toward the center of the representative gear 10', while the convex tooth surfaces face outwardly away from the gear center. In FIG. 2, the cutter periphery is represented by the line CP'. It will be noted that this line intrudes into the area at the center of the gear to be occupied by a shaft or other central structure, and in this typical configuration reaches almost to the center of the gear 10'. This intrusion can be reduced by decreasing the spiral angle and the cutter radius. It is therefore possible to cut a spiral bevel gear in such a way that a relatively thin shaft made integral with the gear blank does not interfere with the cutter. More typically, however, a gear shaft protruding from the toothed face of the gear occupies at least the major portion of the central area within the gear and cannot be cleared by the cutter. It is therefore necessary to form the gear and the shaft separately and use a gear-shaft joint to connect them.

Joints are disadvantageous because they increase weight and cost while reducing accuracy, load capacity and reliability. The reduction in reliability, perhaps the most important disadvantage, is caused by fretting which leads to fatigue failure. Fretting can be severe and is difficult or impossible to detect because the debris that it generates becomes trapped within the joint. Efforts to avoid the effects of fretting lead to increased manufacturing costs and the use of massive joints.

The problems associated with gear-shaft joints are particularly acute when the gear is subjected to high loads as in some aircraft applications, particularly in helicopters. Failure of a shaft or joint in this environment could be catastrophic, resulting in a loss of aircraft, crew and cargo. A shaft that would be cleared by the cutter may be to weak to be acceptable and may not be usable for straddle mounting of the gear. Powdered metallurgy and gear casting techniques that would permit the formation of an integral gear and large shaft cannot, at the present state of those technologies, produce a structure capable of withstanding high loads.

There is, therefore, a need for a gear cut from a blank that can be made integral with a large diameter shaft and is capable of withstanding high loads.

SUMMARY OF THE INVENTION

The present invention accomplishes the above objective by the face mill generation of a spiral bevel gear with an integral central sructure that protrudes from the toothed face of the gear. First a gear blank is formed integrally with the central structure. One or more gear tooth surfaces of a single tooth valley are then cut by causing a cutting tool to rotate and repeatedly engage the blank to remove material therefrom. While it is rotating, the cutting tool is orbiting about a machine axis. Simultaneously, the blank rotates to simulate a gear mesh, with the cutting tool positioned so that the cutter distance exceeds the outer cone distance. The blank is then indexed relative to the cutting tool and one or more surfaces of another tooth valley are cut. The cutter does not intrude into the space occupied by the central structure.

An alternative definition of the invention requires that the mean spiral angle be negative. A preferred form of the cutter employs a plurality of blades arrayed in a circle that are caused to engage the blank sequentially, successively removing additional material from the blank to generate at least one tooth surface.

Another aspect of the invention resides in a gear with an integral central structure that is the product of the method described above.

Other features and advantages of the present invention will become apparent from the following detailed description, taken in conjunction with the accompanying drawings, which illustrate, by way of example, the principles of the invention and the prior art.

DESCRIPTION OF THE PREFERRED EMBODIMENT

Figure 3:
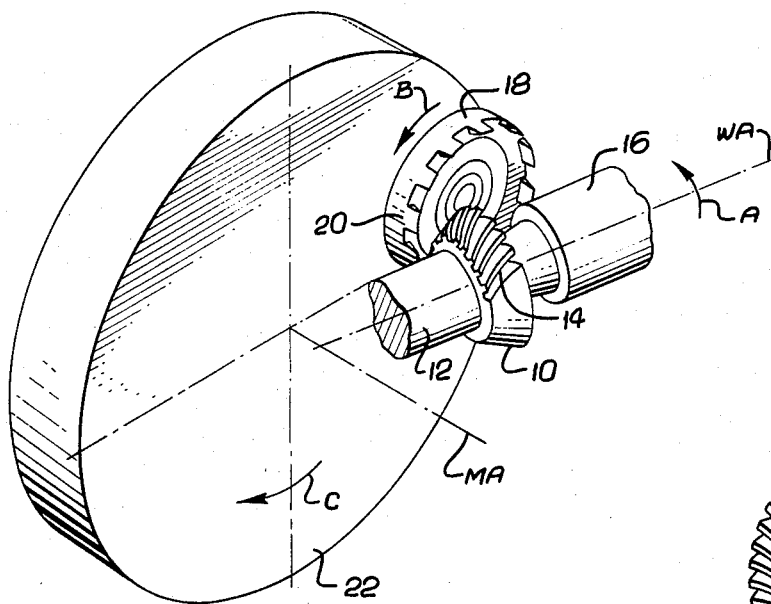
FIG. 3 is a pictorial illustration generally similar to FIG. 1 showing the face mill generation of a spiral bevel gear in accordance with the present invention.

The formation of a spiral bevel gear in accordance with the present invention, illustrated in FIGS. 3-5 and 7, employs a work piece 10 that begins as a gear blank having a shaft 12 that projects axially from what is to be the toothed face 14 of the finished gear. As best shown in FIG. 3, the work piece 10 is mounted on a rotatable workhead 16. A gear is to be generated from the blank 10 by the action of a rotatable cutter 18, using the face mill generation method. The cutter 18 is disc-shaped, having a circular array of substantially identical blades 20 disposed about its periphery. It is mounted on a cradle 22 that is in turn rotatable about a machine axis MA, thus producing an orbital motion of the cutter.

The work piece 10 rotates about a workhead axis WA in the direction of an arrow A, while the cutter 18 rotates in the direction of the arrow B, and the cradle 22 rotates in the direction of the arrow C. As these three rotational movements take place, the work piece 10 and workhead 16 slowly move forward bringing the work piece into repeated and deeper engagement with the cutter 18. This forward movement can be either continuous or incremental and it results in a groove being cut in the blank 10 to generate a single tooth face. In some situations the spread blade method may be used to simultaneously generate two facing tooth surfaces that define a single valley between two teeth. The rotation of the cradle 22 and the blank 10 must be synchronized to simulate a gear mesh. However, the shape of a tooth 24 generated in this way is independent of the rotational speed of the cutter 18.

Figure 1:
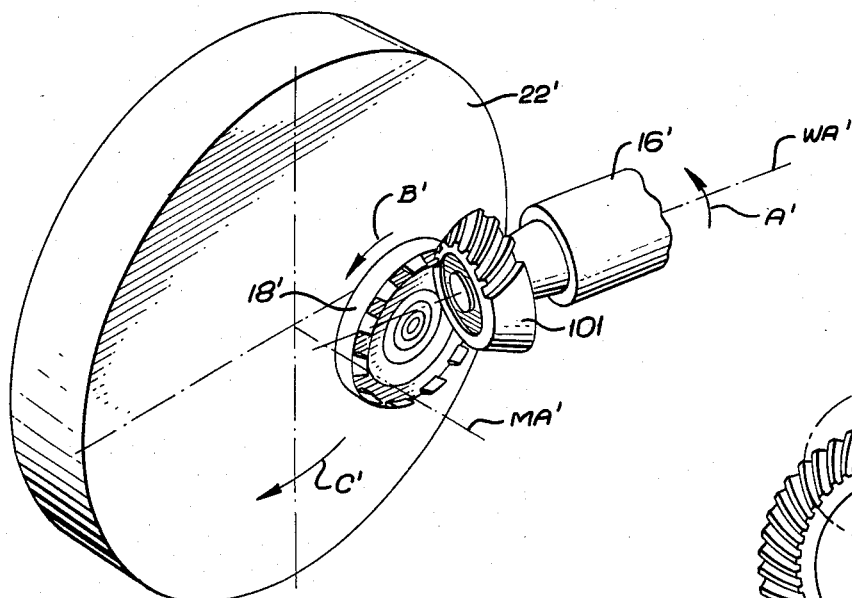
FIG. 1 is a pictorial illustration showing a conventional face mill generation of a spiral bevel gear.
Figure 2:
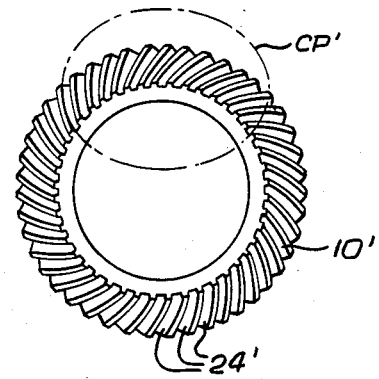
FIG. 2 is an axial plan view of a conventional spiral bevel gear.

It will immediately be recognized that the known and conventional arrangement of machine components, illustrated in FIGS. 1 and 2, is precluded by the presence of the shaft 12 which occupies almost the entire central area of the gear or blank 10 surrounded by the teeth 24. (In FIGS. 1, 2 and 6 corresponding components are identified by the same letters and numbers but with a prime designation.) The cutter 18', shown in FIG. 1 and the cutter periphery CP' shown in FIG. 2 intrude very substantially into this area.

The problem of interference between the cutter 18 and the shaft 12 is solved, according to the present invention, by radically altering the gear tooth configuration in a most unconventional manner. It will be noted that the teeth 24' of the conventional gear 10' shown in FIG. 2 have an arcuate curvature and lie at an angle to the radii of the gear. The orientation of each tooth 24' is such that the concave surface faces inwardly toward the center of the gear 10' rather than outwardly away from the center. In other words, a person looking precisely radially at the outer surface of the gear could see only a convex tooth surface. It is generally accepted that in a gear set the concave surfaces of a pinion gear drive the convex surfaces of the driven gear.

Figure 4:
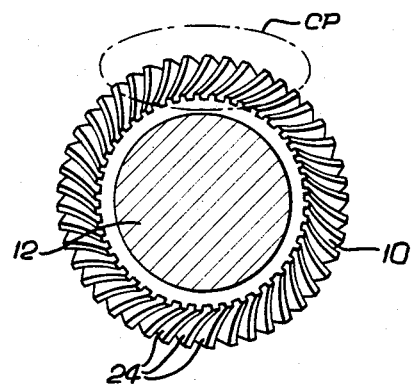
FIG. 4 is an axial plan view of a spiral bevel gear made in accordance with the present invention.

In the fully cut spiral bevel gear 10, shown in FIG. 4, of the configuration of this invention, the teeth 24 have a reverse curvature. A person looking precisely radially inwardly toward the periphery of this gear 10 would see only a concave surface. The convex surfaces face inwardly toward the shaft 12. Preferably this gear would be used in such a way that convex surfaces drive concave surfaces, the opposite of the conventional arrangement.

Figure 5:
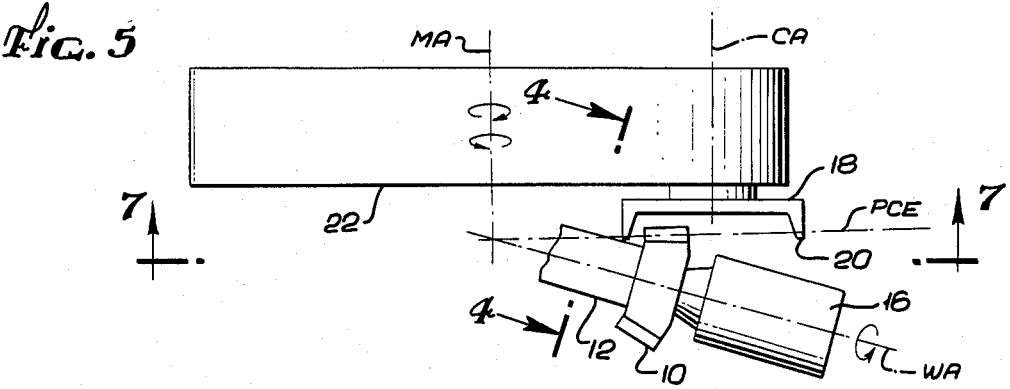
FIGS. 5 and 6 are diagrammatic side view illustrations of the face mill generation of spiral bevel gears in accordance with the present invention and the prior art, respectively.
Figure 6:
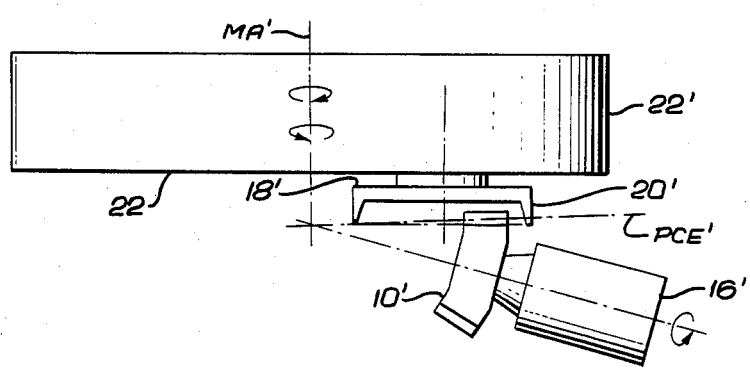
Figure 7:
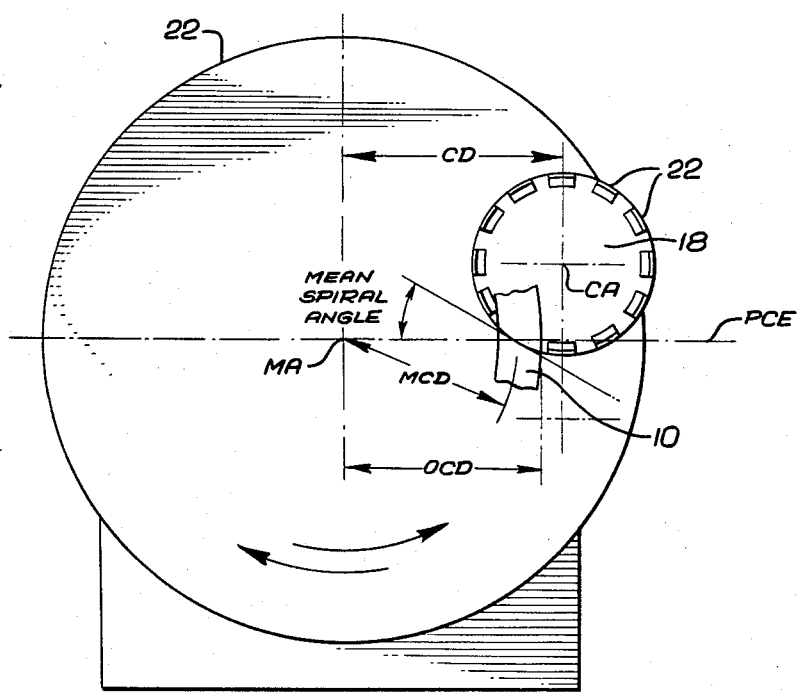
FIG. 7 is diagrammatic illustration of the generation of a spiral bevel gear in accordance with the present invention taken along the line 7—7 of FIG. 5.

The method of cutting this gear 10 is best understood with reference to FIG. 5 where it can be seen that cutter axis CA is disposed much further outwardly with respect to the work piece 10 than in the conventional arrangement of FIG. 6. In fact, the cutter distance CD exceeds the outer cone distance OCD. The cutter distance CD, sometimes known as the horizontal cutter distance, is the radial distance measured perpendicularly from the machine axis MA to the cutter axis CA. The outer cone distance OCD is the radial distance measured perpendicularly from the machine axis MA to the outer edge of the cone of the gear being generated.

Another unusual feature of the present invention is that the mean spiral angle MSA is negative. The mean spiral angle MSA is the angle between a pitch cone element PCE and a tangent of a convex tooth face measured at the point where the gear pitch cone element intersects the mean cone distance. The mean cone distance is the mid-point between the inner and outer peripheral edges of the truncated cone having its apex at the machine axis MA and passing through the gear teeth along the pitch cone. In a conventional spiral bevel gear cutting arrangement such as that shown in FIG. 6 the spiral angle is always positive or is zero in the extreme case of a Zerol gear.

It will be noted that, as best shown in FIGS. 3, 4 and 5, the cutter 18 does not intrude into the area occupied by the shaft 12 as it would if positioned in the conventional manner of the cutter shown in FIGS. 1, 2 and 6. The gear blank 10 of the invention can therefore be fully cut despite the presence of the shaft 12 or any other such integrally formed central structure that protrudes axially from the toothed face of the gear thus generated. The need for a joint between the gear 10 and the shaft 12 is therefore eliminated.

There are unexpected advantages to a reverse curvature spiral bevel gear made in accordance with the present invention apart from its manufacturability. The face contact ratio is higher for a given spiral angle, meaning that more teeth share the load when compared to a conventional gear of the same size. If desired, the spiral angle of the gear can be reduced in comparison to a conventional gear and the face contact ratio thus made equal. With a reduced spiral angle, smaller, lighter bearings can be used.

There are limitations associated with the gears of the present invention. It will be observed that the maximum diameter of a gear that can be cut by a given machine is reduced. Care must be taken to insure that the cutter does not intrude into the blank as the blades continue on their circular path after cutting the tooth. This potential intrusion, which must be avoided, is a function of gear blank size, tooth depth, cutter diameter and spiral angle.

On balance it will be found that the present invention is particularly useful in those situations in which gears with shafts or other central structures protruding from their toothed surfaces must withstand high loads with a high degree of reliability. In addition the cost of manufacturing and assembling the joint is avoided. There is also a considerable weight savings, which is particularly important in aircraft applications.

While a particular form of the invention has been illustrated and described, it will be apparent that various modifications can be made without departing from the spirit and scope of the invention.

I claim:

1. A method of face mill generation of a spiral bevel gear with an integral central structure that protrudes from the toothed face of the gear comprising:

forming a gear blank integrally with said central structure;

cutting one or more individual gear tooth surfaces of a single tooth valley on said blank by causing a cutting tool to rotate and thereby repeatedly engage said blank and remove material therefrom while causing said cutting tool to orbit about a machine axis and while rotating said blank so as to simulate a gear mesh with said cutting tool;

indexing said blank relative to said cutting tool; and cutting one or more gear tooth surfaces of another tooth valley, said tool being positioned such that the cutter distance exceeds the outer cone distance of the gear thus generated whereby the path of said cutting tool does not intrude into the space occupied by said central structure.

2. The method of claim 1 wherein the location of said cutting tool is such that the mean spiral angle is negative.

3. The method of claim 1 wherein said cutting tool includes a circular array of blades that are caused to engage said blank sequentially as said cutting tool rotates, said blades successively removing additional material from said blank to generate a single tooth surface.

4. A spiral bevel gear with a central structure protruding from the toothed surface thereof made in accordance with the method of claim 1, 2 or 3.

5. A method of face mill generation of a spiral bevel gear with an integral central structure that protrudes from the toothed face of the gear comprising:

forming a gear blank integrally with said central structure;

cutting one or more individual gear tooth surfaces of a single tooth valley on said blank by causing a cutting tool to rotate and thereby engage said blank and remove material therefrom while causing said cutting tool to orbit about a cradle axis and while rotating said blank so as to simulate a gear mesh with said cutting tool;

indexing said blank relative to said cutting tool; and cutting one or more gear tooth surfaces of another tooth valley, the motion of said cutting tool being such that the gear thus generated has a mean spiral angle that is negative.

6. The method of claim 5 wherein said cutting tool includes a circular array of blades that are caused to engage said blank sequentially as said cutting tool rotates, said blades successively removing additional material from said blank to generate a single tooth surface.

7. A spiral bevel gear with a central structure protruding from the toothed surface thereof made in accordance with the method of claim 5 or 6.

* * * * *